(12) United States Patent
Saad et al.

(10) Patent No.: US 9,064,222 B2
(45) Date of Patent: Jun. 23, 2015

(54) REAL TIME MISSION PLANNING

(75) Inventors: Emad William Saad, Renton, WA (US); Stefan Richard Bieniawski, Seattle, WA (US); Paul Edward Riley Pigg, St. Louis, MO (US); John Lyle Vian, Renton, WA (US); Paul Michael Robinette, Phoenix, AZ (US); Donald Coolidge Wunsch, II, Rolla, MO (US)

(73) Assignee: THE BOEING COMPANY, Chicago, IL (US)

( * ) Notice: Subject to any disclaimer, the term of this patent is extended or adjusted under 35 U.S.C. 154(b) by 646 days.

(21) Appl. No.: 12/780,621

(22) Filed: May 14, 2010

(65) Prior Publication Data

US 2011/0283285 A1  Nov. 17, 2011

(51) Int. Cl.
  *G06F 9/46* (2006.01)
  *G06Q 10/06* (2012.01)
  *G05D 1/00* (2006.01)
  *G06Q 10/10* (2012.01)

(52) U.S. Cl.
  CPC ............. *G06Q 10/0631* (2013.01); *G05D 1/00* (2013.01); *G06Q 10/103* (2013.01)

(58) Field of Classification Search
  None
  See application file for complete search history.

(56) References Cited

U.S. PATENT DOCUMENTS

| | | | | |
|---|---|---|---|---|
| 5,642,467 A * | 6/1997 | Stover et al. | | 700/250 |
| 5,951,609 A * | 9/1999 | Hanson et al. | | 701/13 |
| 6,122,572 A * | 9/2000 | Yavnai | | 701/23 |
| 6,493,609 B2 * | 12/2002 | Johnson | | 701/3 |
| 6,910,892 B2 * | 6/2005 | Lechner | | 434/43 |
| 7,154,496 B1 * | 12/2006 | Engel et al. | | 345/419 |
| 7,693,624 B2 * | 4/2010 | Duggan et al. | | 701/24 |
| 7,813,888 B2 * | 10/2010 | Vian et al. | | 702/113 |
| 7,894,952 B2 * | 2/2011 | Donovan et al. | | 701/36 |
| 8,515,609 B2 * | 8/2013 | McAndrew et al. | | 701/23 |
| 8,612,085 B2 * | 12/2013 | Flohr et al. | | 701/27 |
| 2001/0019328 A1 * | 9/2001 | Schwuttke et al. | | 345/440 |
| 2001/0023390 A1 * | 9/2001 | Gia | | 701/301 |
| 2002/0161489 A1 * | 10/2002 | Johnson | | 701/4 |

(Continued)

FOREIGN PATENT DOCUMENTS

| JP | H06344279 A | 12/1994 |
|---|---|---|
| JP | 2001353678 A | 12/2001 |

(Continued)

OTHER PUBLICATIONS

Valenti et al.; "Implementation of a Manned Vehicle—UAV Mission System", AIAA Guidance, Navigation, and Control Conference and Exhibit; Aug. 16-19, 2004, (Valenti_08192004.pdf; pp. 16).*

(Continued)

*Primary Examiner* — Emerson Puente
*Assistant Examiner* — Hiren Patel
(74) *Attorney, Agent, or Firm* — Yee & Associates, P.C.

(57) ABSTRACT

The different advantageous embodiments provide a system comprising a number of computers, a graphical user interface, first program code stored on the computer, and second program code stored on the computer. The graphical user interface is executed by a computer in the number of computers. The computer is configured to run the first program code to define a mission using a number of mission elements. The computer is configured to run the second program code to generate instructions for a number of assets to execute the mission and monitor the number of assets during execution of the mission.

24 Claims, 9 Drawing Sheets

(56) References Cited

U.S. PATENT DOCUMENTS

| | | | |
|---|---|---|---|
| 2003/0190587 A1* | 10/2003 | Lechner | 434/43 |
| 2004/0030463 A1* | 2/2004 | Stockdale et al. | 701/3 |
| 2005/0004723 A1* | 1/2005 | Duggan et al. | 701/24 |
| 2005/0203967 A1* | 9/2005 | Matsui | 707/202 |
| 2006/0184291 A1* | 8/2006 | Paradis et al. | 701/23 |
| 2006/0184292 A1 | 8/2006 | Appleby et al. | |
| 2006/0235739 A1 | 10/2006 | Levis et al. | |
| 2007/0021879 A1* | 1/2007 | DelNero et al. | 701/23 |
| 2007/0021880 A1* | 1/2007 | Appleby et al. | 701/23 |
| 2007/0032920 A1* | 2/2007 | Dapp et al. | 701/3 |
| 2007/0061053 A1* | 3/2007 | Zeitzew | 701/1 |
| 2008/0033684 A1 | 2/2008 | Vian et al. | |
| 2008/0051997 A1* | 2/2008 | Rosenberg | 701/211 |
| 2008/0125933 A1* | 5/2008 | Williams et al. | 701/30 |
| 2009/0076665 A1* | 3/2009 | Hoisington et al. | 701/2 |
| 2009/0125163 A1* | 5/2009 | Duggan et al. | 701/2 |
| 2009/0125225 A1* | 5/2009 | Hussain et al. | 701/200 |
| 2009/0300180 A1* | 12/2009 | Dehaan et al. | 709/225 |
| 2009/0326735 A1* | 12/2009 | Wood et al. | 701/2 |
| 2010/0017049 A1* | 1/2010 | Swearingen et al. | 701/3 |
| 2010/0084513 A1* | 4/2010 | Gariepy et al. | 244/190 |
| 2010/0100269 A1* | 4/2010 | Ekhaguere et al. | 701/26 |
| 2010/0114633 A1* | 5/2010 | Sislak et al. | 705/7 |
| 2010/0198514 A1* | 8/2010 | Miralles | 701/302 |
| 2010/0312388 A1* | 12/2010 | Jang et al. | 700/248 |
| 2011/0015816 A1* | 1/2011 | Dow et al. | 701/23 |
| 2011/0082717 A1* | 4/2011 | Saad et al. | 705/7.13 |
| 2011/0130916 A1* | 6/2011 | Mayer | 701/33 |
| 2011/0184604 A1* | 7/2011 | Franke et al. | 701/23 |
| 2011/0246551 A1* | 10/2011 | Giancaspro et al. | 709/202 |
| 2014/0142785 A1* | 5/2014 | Fuentes et al. | 701/2 |

FOREIGN PATENT DOCUMENTS

| | | |
|---|---|---|
| JP | 2006106919 A | 4/2006 |
| JP | 2007093045 A | 4/2007 |
| WO | WO2010076787 A2 | 7/2010 |

OTHER PUBLICATIONS

Bieniawski et al., "Exploring Health-Enabled Mission concepts in the Vehicle Swarm Technology Laboratory", AIAA Infotech@Aerospace Conference, Apr. 6-9, 2009, Seattle, Washington, American Institute of Aeronautics and Astronautics, Inc., 2009, pp. 1-13.

International Search Report and Written Opinion of the International Searching Authority, dated Jan. 2, 2013, regarding Application No. PCT/US2011/032459 (WO2011142933), 10 pages.

Extended European Search Report, dated Feb. 20, 2015, regarding Application No. EP11722637.3, 6 pages.

English Translation of Notice of Reasons for Rejection, dated Mar. 3, 2015, regarding Japanese Patent Application No. 2013-510105, 2 pages.

* cited by examiner

REAL TIME MISSION PLANNING

BACKGROUND INFORMATION

1. Field

The present disclosure relates generally to missions and, in particular, to a method and system for mission planning. Still more particularly, the present disclosure provides a method and system for defining, executing, and modifying a mission in real-time.

2. Background

Mission planning involves various resources and tasks that come together to form a mission. Different resources may be deployed for different tasks that make up a mission, for example. Complex missions must be manually scripted to manage multiple resources and multiple tasks for a single mission, and cannot be changed during execution of the mission.

Missions are typically scripted manually and completed offline before the missions are run by a computer system. Many of these current systems are specific to a single mission type, such as an area search mission for example. The existing solutions are not practical for dynamic applications where missions need to be created and modified on the fly. Once execution of the mission begins, the mission cannot be modified during execution.

Therefore, it would be advantageous to have a method and apparatus that addresses one or more of the issues discussed above.

SUMMARY

The different advantageous embodiments provide a system comprising a number of computers, a graphical user interface, first program code stored on the computer, and second program code stored on the computer. The graphical user interface is executed by a computer in the number of computers. The computer is configured to run the first program code to define a mission using a number of mission elements. The computer is configured to run the second program code to generate instructions for a number of assets to execute the mission and monitor the number of assets during execution of the mission.

The different advantageous embodiments further provide a method for mission planning. A computer receives a user definition of a mission. A mission script is generated using the user definition and a number of mission elements. The number of mission elements is assigned to a number of assets. Execution of the number of mission elements by the number of assets is controlled. The number of assets executing the mission is monitored.

The different advantageous embodiments further provide a computer program product for mission planning comprising a computer recordable storage medium and program code stored on the computer recordable storage medium. The program code receives a user definition of a mission, generates a mission script using the user definition and a number of mission elements, assigns the number of mission elements to a number of assets, generates instructions for the number of assets to execute the mission using the number of mission elements, and monitors the number of assets executing the mission.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
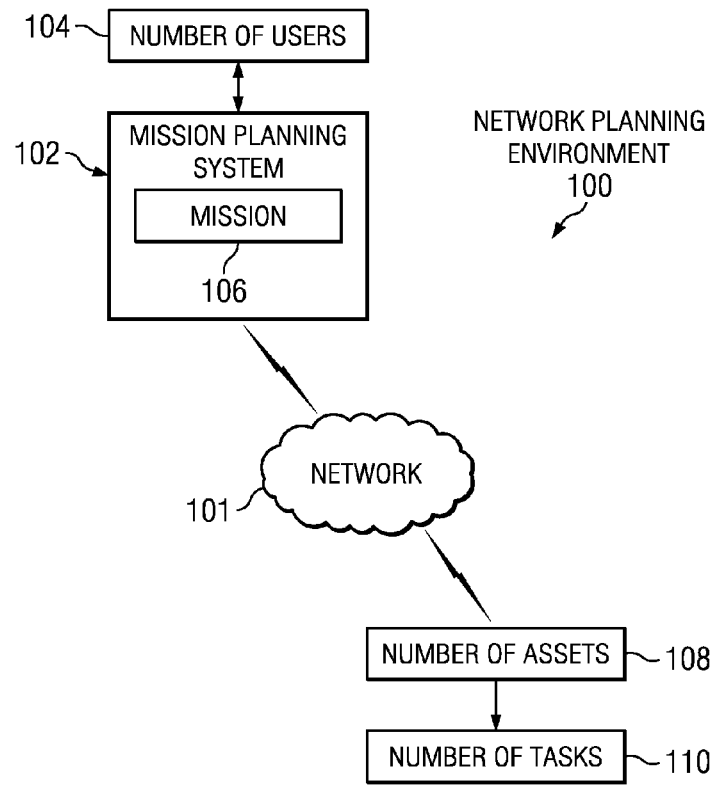
FIG. 1 is an illustration of a network planning environment in which an advantageous embodiment may be implemented.
Figure 2:
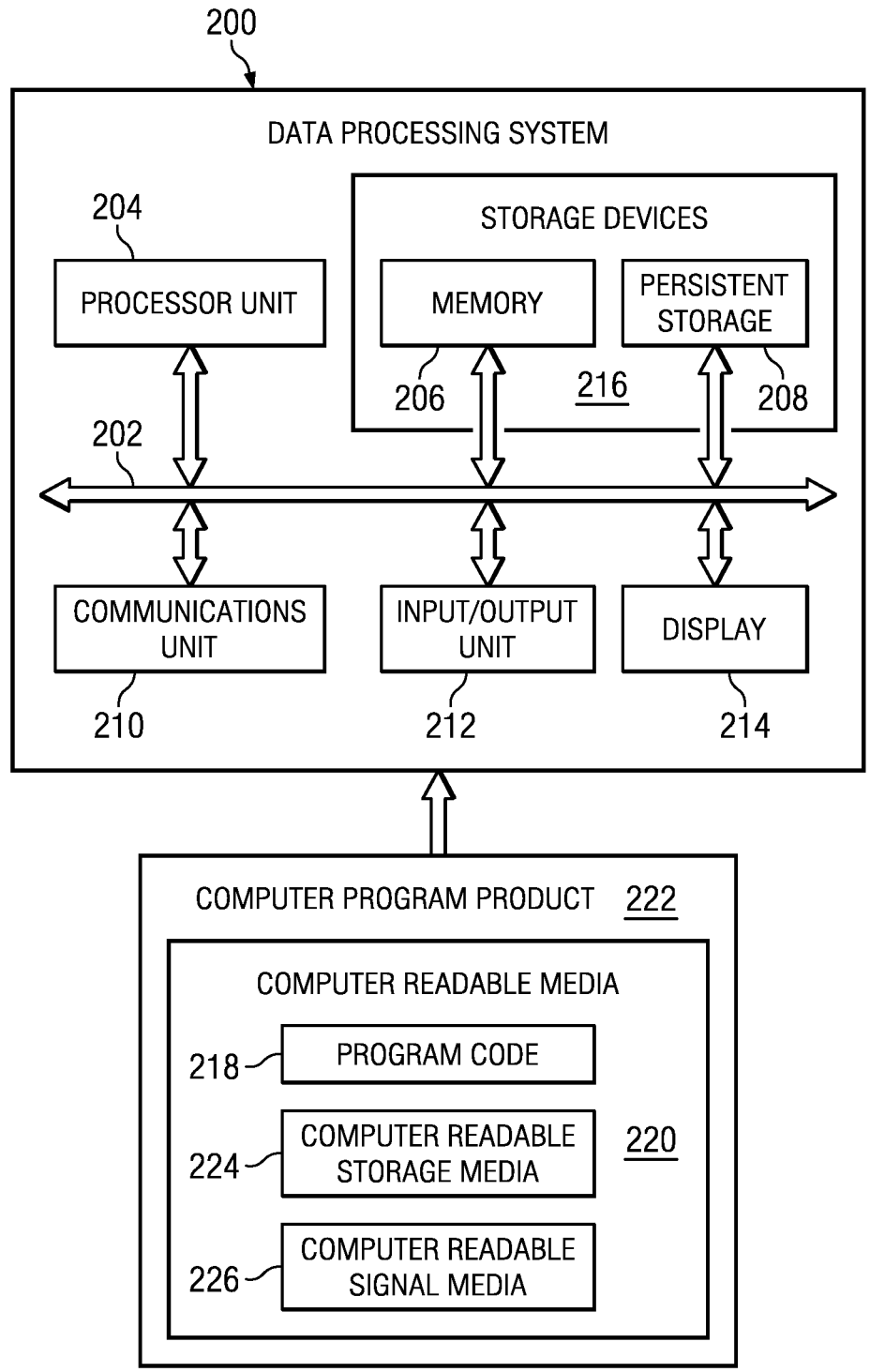
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network planning environment in which the advantageous embodiments of the present invention may be implemented. Network planning environment 100 is a network of computers in which embodiments may be implemented. Network planning environment 100 contains network 101, which is the medium used to provide communications links between various devices and computers connected together within network planning environment 100. Network 101 may include connections, such as wire, wireless communication links, or fiber optic cables.

In the depicted example, mission planning system 102 connects to network 101 along with number of assets 108. Mission planning system 102 may include a number of servers and a number of clients, in an advantageous embodiment. In another advantageous embodiment, servers and clients of mission planning system 102 may be located in a number of locations and connect to network 101, for example. Mission planning system 102 may include, for example, data processing systems, personal computers, and/or network computers.

Number of users 104 interacts with mission planning system 102 to plan mission 106, monitor mission 106 in a real-time environment, and/or modify mission 106 in a real-time environment. Number of users 104 may include human users, robotic and/or machine users, program code, and/or any other suitable user of mission planning system 102.

Number of assets 108 may exchange data with mission planning system 102 through a wireless communications link or through any other type of communications link using network 101. In these examples, number of assets 108 may be computers and/or assets controlled by a computer. Assets controlled by a computer may include, for example, without limitation, mobile assets, vehicles, sensors, machines, charging stations, and/or any other suitable asset. Network planning environment 100 may include additional servers processes, clients processes, and other devices not shown.

Number of assets 108 may execute number of tasks 110 in order to accomplish mission 106, in an illustrative example. Mission 106 may be a collection of tasks. Number of tasks 110 may combine to form mission 106, for example.

In the depicted example, network planning environment 100 is the Internet with network 101 representing a worldwide collection of networks and gateways that use the Transmission Control Protocol/Internet Protocol (TCP/IP) suite of protocols to communicate with one another. Of course, network planning environment 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a block diagram of a data processing system is depicted in accordance with an advantageous embodiment. Data processing system 200 is an example of a data processing system that may be used to implement servers and clients, such as mission planning system 102 and number of assets 108.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current mission planning systems involve scripting missions offline then running the missions after they are completed offline. Many of these current systems are specific to a single mission type, such as an area search mission for example. The existing solutions are not practical for dynamic applications where missions need to be created and modified on the fly. These current systems are rigid and do not provide for modifying a mission once execution starts. The systems currently available require a user to be able to write code and script the mission manually as well. Manual scripting of missions is labor extensive and very costly. In addition, manually scripted missions require more extensive testing since they are built from scratch and the testing process increases with the mission complexity.

Thus, the different advantageous embodiments provide a system comprising a number of computers, a graphical user interface, first program code stored on the computer, and second program code stored on the computer. The graphical user interface is executed by a computer in the number of computers. The computer is configured to run the first program code to define a mission using a number of mission elements. The computer is configured to run the second program code to generate instructions for a number of assets to execute the mission and monitor the number of assets during execution of the mission.

The different advantageous embodiments further provide a method for mission planning. A computer receives a user definition of a mission. A mission script is generated using the user definition and a number of mission elements. The number of mission elements is assigned to a number of assets. Execution of the number of mission elements by the number of assets is controlled. The number of assets executing the mission is monitored.

The different advantageous embodiments further provide a computer program product for mission planning comprising a computer recordable storage medium and program code stored on the computer recordable storage medium. The program code receives a user definition of a mission, generates a mission script using the user definition and a number of mission elements, assigns the number of mission elements to a number of assets, generates instructions for the number of assets to execute the mission using the number of mission elements, and monitors the number of assets executing the mission.

Figure 3:
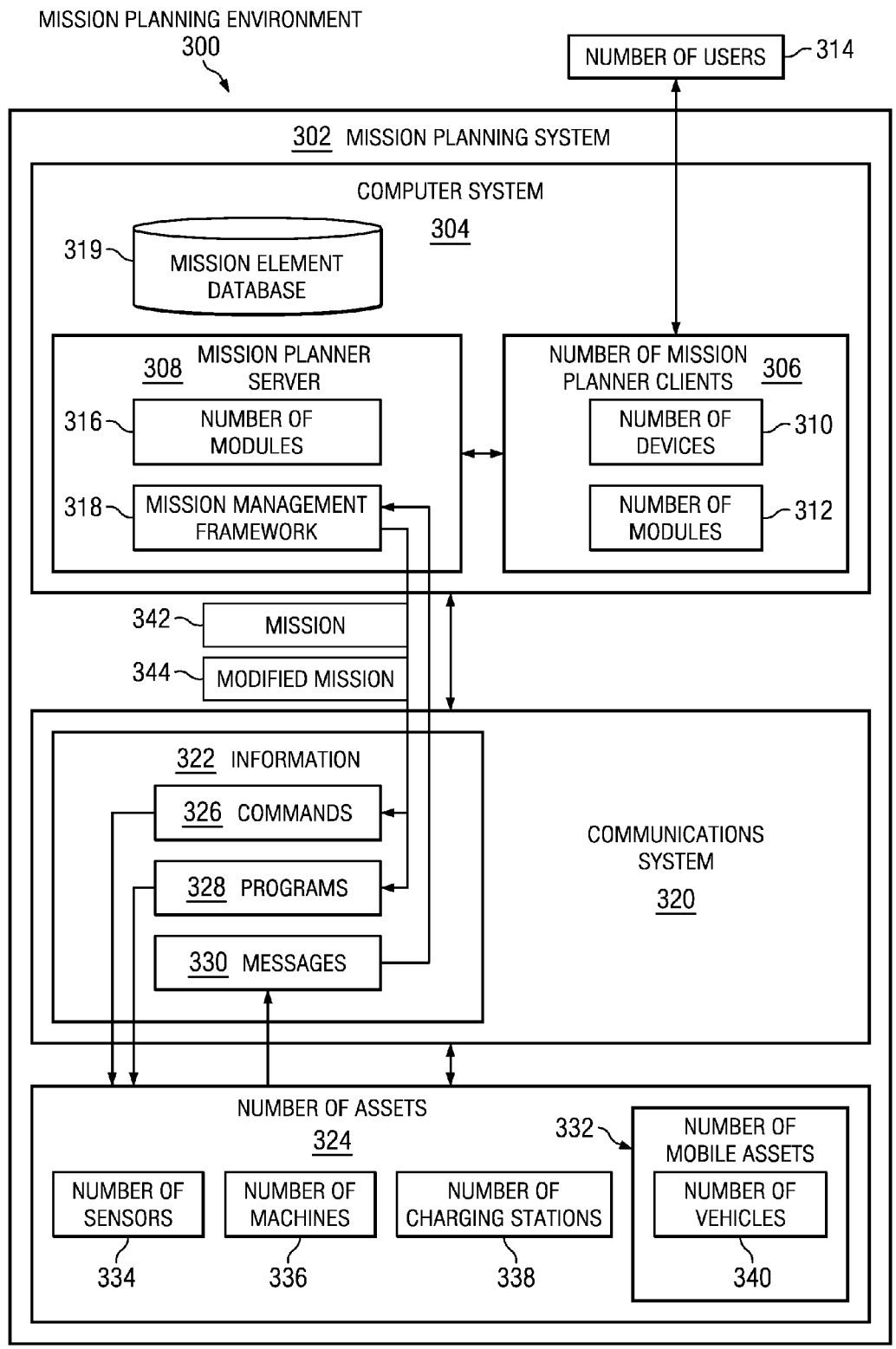
FIG. 3 is an illustration of a mission planning environment in accordance with an advantageous embodiment.

With reference now to FIG. 3, an illustration of a mission planning environment is depicted in accordance with an advantageous embodiment. Mission planning environment 300 may be implemented in a network environment, such as network planning environment 100 in FIG. 1, for example.

Mission planning environment 300 may be any type of environment suitable for generating, monitoring, updating, modifying, and/or approving missions, for example. Mission planning environment 300 includes mission planning system 302. Mission planning system 302 is an illustrative example of mission planning system 102 in FIG. 1. Mission planning system 302 defines, executes, and monitors a number of missions involving a number of assets in the different advantageous embodiments.

Mission planning system 302 includes computer system 304. Computer system 304 may be implemented as a number of computers and/or data processing systems, such as data processing system 200 in FIG. 2. Computer system 304 may include number of mission planner clients 306 and mission planner server 308. In one advantageous embodiment, computer system 304 may be implemented using a number of data processing systems, where each data processing system includes an instance of number of mission planner clients 306 and connects to mission planner server 308 at a central data processing system using a network, such as network 101 in FIG. 1, for example. In another advantageous embodiment, number of mission planner clients 306 and mission planner server 308 may be implemented on the same data processing system and accessed using a number of different data processing systems, for example.

Number of mission planner clients 306 is a graphical user interface used to remotely build missions. Number of mission planner clients 306 may include number of devices 310 and number of modules 312. Number of devices 310 may include, for example, without limitation, a display, data-glove, a personal digital assistant, a laptop, mouse, trackpad, keyboard, joystick, a touchscreen, an optical interface, a visual interface, a tactile interface, video console, wireless controller, wireless three dimensional (3D) controller, and/or any other suitable device. In one illustrative example, a wireless 3D controller may be a remote control pointing device that includes a number of accelerometers and an infrared detector for detecting motion in three dimensional space. In another illustrative example, a wireless 3D controller may include a number of accelerometers used to directly control a number of mobile assets when given control by a mission element in the mission generated by mission planner server 308. In an advantageous embodiment, number of devices 310 may be available for use with specialized mission elements generated by mission planner server 308, for example.

Number of mission planner clients 306 communicates with mission planner server 308 through a messaging format, such as, for example, without limitation, extensible markup language—remote procedure call (XML-RPC). In an illustrative example, number of modules 312 may be written in a language such as Python using wxPython for the graphical components of number of mission planner clients 306. Number of modules 312 may include, for example, without limitation, data and functions necessary to describe and create mission elements and graphical components needed to manipulate mission elements within the graphical user interface of number of mission planner clients 306 during creation of a mission. Number of users 314 is able to create mission elements using number of modules 312 and number of devices 310 of number of mission planner clients 306.

Mission planner server 308 is a process executing on a computer, such as data processing system 200 in FIG. 2, for example. Mission planner server 308 listens for incoming XML-RPC communication from number of mission planner clients 306 and processes the incoming communication to query and modify a current mission, for example. Mission planner server 308 keeps the current mission in memory, such as memory 206 in FIG. 2, before and during execution of the current mission, which allows number of mission planner clients 306 to create and execute the current mission while adding new elements in real time.

Mission planner server 308 includes number of modules 316 and mission management framework 318. In an illustrative example, number of modules 316 may be written in a language such as Python. Number of modules 316 may include, for example, without limitation, data and functions necessary to identify, manipulate, and store mission functions and parameters, as well as parse mission elements for information during execution of the mission.

Mission management framework 318 is a system that includes a library of mission elements and a library of assets, as well as a number of processes for task allocation. The library of mission elements includes a number of mission elements to be executed in a current mission. The number of mission elements is retrieved from mission element database 319 and stored into the library of mission elements by mission planner server 308 during mission creation, for example. Mission element database 319 includes a number of mission elements pre-defined by a user.

The library of assets includes a list of all assets, such as number of assets 324, along with information about each asset. For example, the library of assets may include information about the availability of an asset, the readiness of an asset for use in a mission and/or task, the health of an asset, the resource use of an asset, the resource depletion by an asset, the current status of an asset, and/or any other suitable information associated with an asset.

Mission management framework 318 identifies the assets and tasks needed to execute a number of mission elements, and sends instructions to the number of assets identified to assign and control execution of a number of tasks and/or missions. When issues arise during execution of a mission, mission management framework 318 autonomously reconfigures the mission to achieve the mission objective using available assets, for example. In other words, the assets become an extension of mission planning system 302, where mission management framework 318 is the brain and the assets are components of the body, for example. Mission management framework 318 sends out instructions for the assets to execute tasks and receives back messages from the assets about the status of the tasks and/or the status of the assets. These messages from the assets are used by mission management framework 318 to reconfigure instructions dynamically during a mission execution in a bottom up and top down planning structure.

Communications system 320 connects computer system 304 to number of assets 324. Communications system 320 receives and transmits information 322 between mission management framework 318 and number of assets 324. Information 322 may include, for example, without limitation, commands 326, programs 328, and messages 330. Communications system 320 may be a wireless communication system or a wired communication system in the different advantageous embodiments.

In one advantageous embodiment, number of users 314 may initiate a mission planning task using number of mission planner clients 306 on computer system 304. For example, number of users 314 may identify a specific task or mission for mission planning system 302 to execute. Number of users 314 may be local to number of assets 324 or may be very remote from number of assets 324. For example, number of assets 324 may be in a different location, country, or planet than number of users 314, such as a number of autonomous vehicles deployed on the moon and being controlled by mission management framework 318 from the earth. Mission planning system 302 may provide number of users 314 with the capability to build and monitor complex missions in real-time during execution of the missions by number of assets 324 regardless of the proximity, or lack thereof, of number of users 314 to number of assets 324. Number of mobile assets 332, number of sensors 334, number of machines 336, and number of charging stations 338 may be examples of a number of assets that may be included in number of assets 324.

Number of mobile assets 332 may include, for example, without limitation, number of vehicles 340. Number of vehicles 340 may be any type of vehicle including, without limitation, autonomous vehicles, semi-autonomous vehicles, unmanned vehicles, manned vehicles, and/or any other suitable vehicle. A vehicle may be an automobile, a land vehicle, a marine vessel, an aircraft, a spacecraft, a wall-climbing robot, and/or any other suitable type of vehicle, for example.

In an illustrative example, number of users 314 may use number of mission planner clients 306 to build a mission. Number of mission planner clients 306 communicates the mission dynamically as it is being built by number of users 314 to mission planner server 308. Mission planner server 308 generates a high level mission script for mission management framework 318. For example, the high level mission script may include high level commands. Mission management framework 318 converts these high level commands into low level commands, and generates a mission script for specific assets in number of assets 324. For example, the mission script generated by mission management framework 318 may include commands to turn on and deploy one or more specific assets associated with a mission element. A mission script is a number of instructions. These instructions may include commands 326 and/or programs 328 for number of assets 324, for example. Mission management framework 318 sends mission 342, having commands 326 and/or programs 328, to number of assets 324 using communication system 320. Number of assets 324 execute mission 342 according to commands 326 and/or programs 328, and communicate messages 330 back to mission management framework 318 during execution of the mission. Messages 330 may include, for example, without limitation, status of the mission, status of a number of tasks, and/or status of number of assets 324. Mission management framework 318 may use the information received in messages 330 to modify mission 342, sending modified mission 344 back to number of assets 324.

In an illustrative example, messages 330 may include information about one or more of number of vehicles 340 exhausting current fuel resources before the completion of a task involved in mission 342. Mission management framework 318 may reconfigure mission 342 to identify another vehicle that is fueled and capable of completing the incomplete task, and send modified mission 344 instructing the new vehicle to complete the incomplete task, in this illustrative example.

The illustration of mission planning environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, mission planning system 302 may be implemented with other computer systems in addition to computer system 304. In another advantageous embodiment, computer system 304 may include additional mission planner clients implemented on additional data processing systems for use by number of users 314 in simultaneous mission planning and/or planning of multiple missions, for example.

Figure 4:
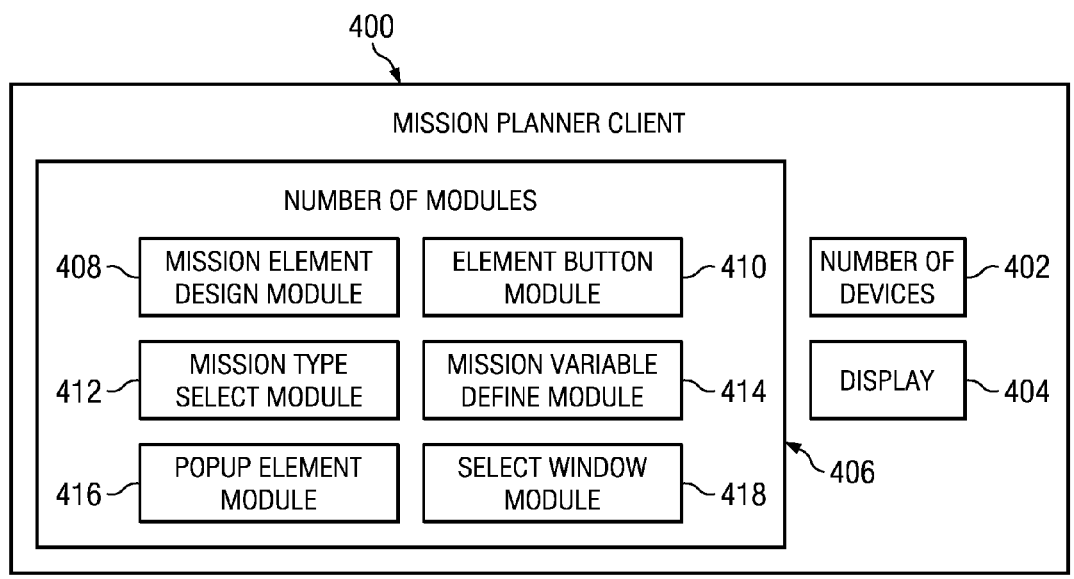
FIG. 4 is an illustration of a mission planner client in accordance with an advantageous embodiment.

With reference now to FIG. 4, an illustration of a mission planner client is depicted in accordance with an advantageous embodiment. Mission planner client 400 is an illustrative example of number of mission planner clients 306 in FIG. 3.

Mission planner client 400 includes number of devices 402, display 404, and number of modules 406. Number of devices 402 is an illustrative example of one implementation of number of devices 310 in FIG. 3. Display 404 may be an example of one type of device in number of devices 402 used by number of users 314 in FIG. 3 to interact with mission planner client 400.

Number of modules 406 include mission element design module 408, element button module 410, mission type select module 412, mission variable define module 414, popup element module 416, and select window module 418. Number of modules 406 is a number of software modules presented on a user interface as buttons, tabs, text boxes, pull-down menus, and the like, that correspond to a given software module.

Mission element design module 408 contains all of the data and functions necessary to describe and graphically depict a mission element. In an illustrative example, the mission element may be graphically depicted as a rectangle with triangles to indicate lines to connect the mission element with a previous mission element and/or a next mission element, for example, using a device, such as display 404.

Element button module 410 contains program code necessary to graphically depict a button within a screen of the graphical user interface, as well as program code to create a new mission element when the button depicted is selected, or pressed. Element button module 410 spawns a missionType-Select window, linked to mission type select module 412, to determine the start and stop parameters for the mission element as well as its label before the creation of the mission element.

Mission type select module 412 presents a dialog box to allow a user, such as number of users 314 in FIG. 3, to define the start and stop types associated with the start and stop parameters of element button module 410, as well as values for the mission element. Mission type select module 412 is called after the user selects an elementButton, generated by element button module 410, but before a missionElement is created by element button module 410. In an illustrative example, options within the dialog box presented by mission type select module 412 may be grayed out to show the user what is available in the current state. For example, an element is not allowed to end on a sequence change when it does not begin on a sequence change. In another example, an element cannot begin at the end of a previous element if no elements are defined yet. Only values for currently selected types are allowed to be changed in the dialog box presented by mission type select module 412.

Mission variable define module 414 presents a dialog box to allow the user to change some variables in a mission. The variables may be presented in two columns to conserve screen space, in one illustrative example. This dialog is presented immediately after a missionElement is defined and before a missionElement is created.

Popup element module 416 presents program code to the current element as static text. Popup element module 416 may be an optional selection by a user who wants to see the code that makes up a mission element. The user selects popup element module 416 to display the code of a mission element. The code is static because the user can view the code but cannot modify the code.

Select window module 418 presents the user with a selection of a number of different options having a number of different values. The values are the code for the functions of each option. Some options may allow for multiple selections while other options only allow for a single selection. These options may be defined when the window is created.

Figure 6:
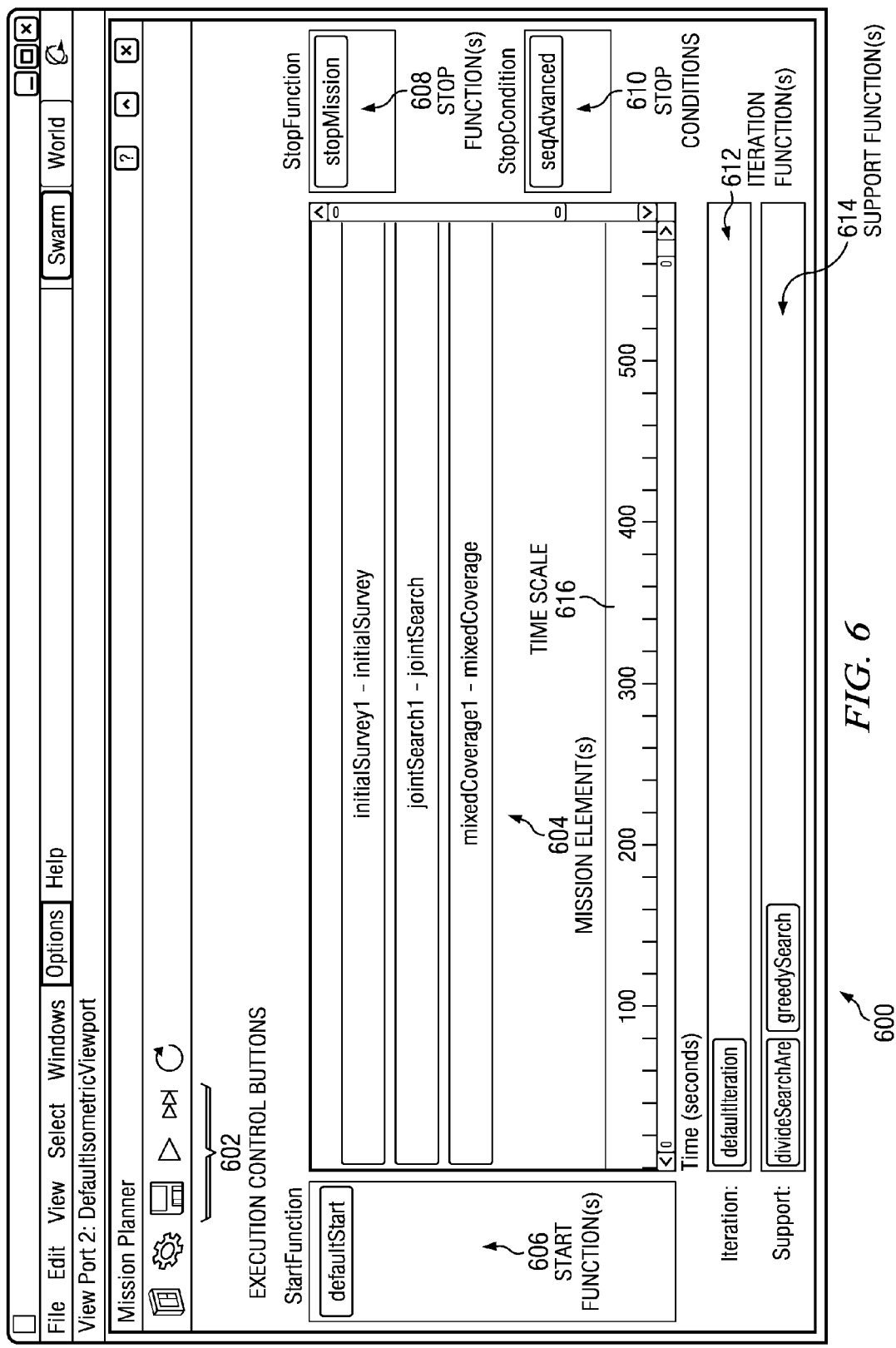
FIG. 6 is an illustration of a graphical user interface in accordance with an advantageous embodiment.
Figure 7:
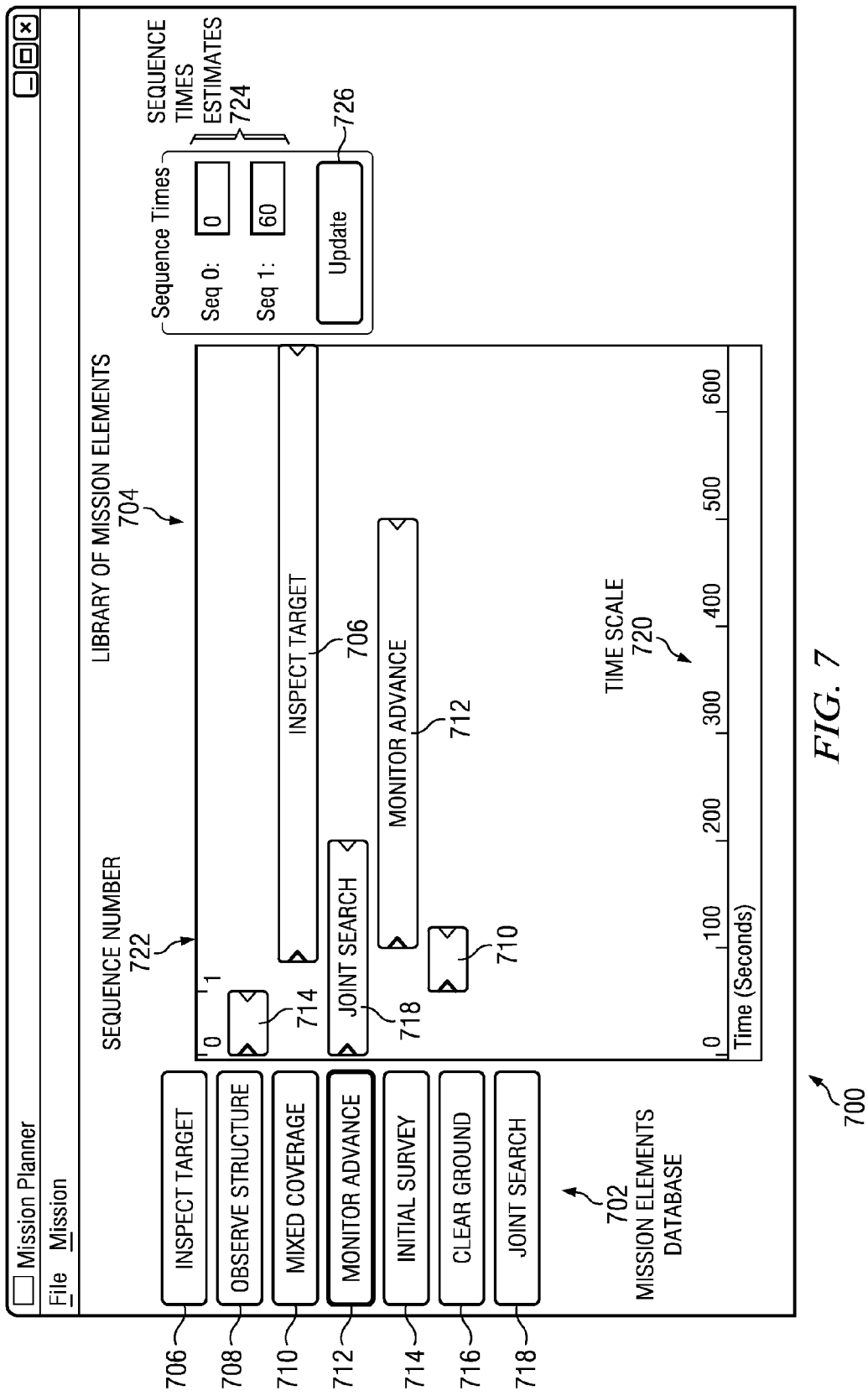
FIG. 7 is an illustration of a graphical user interface in accordance with an advantageous embodiment.
Figure 8:
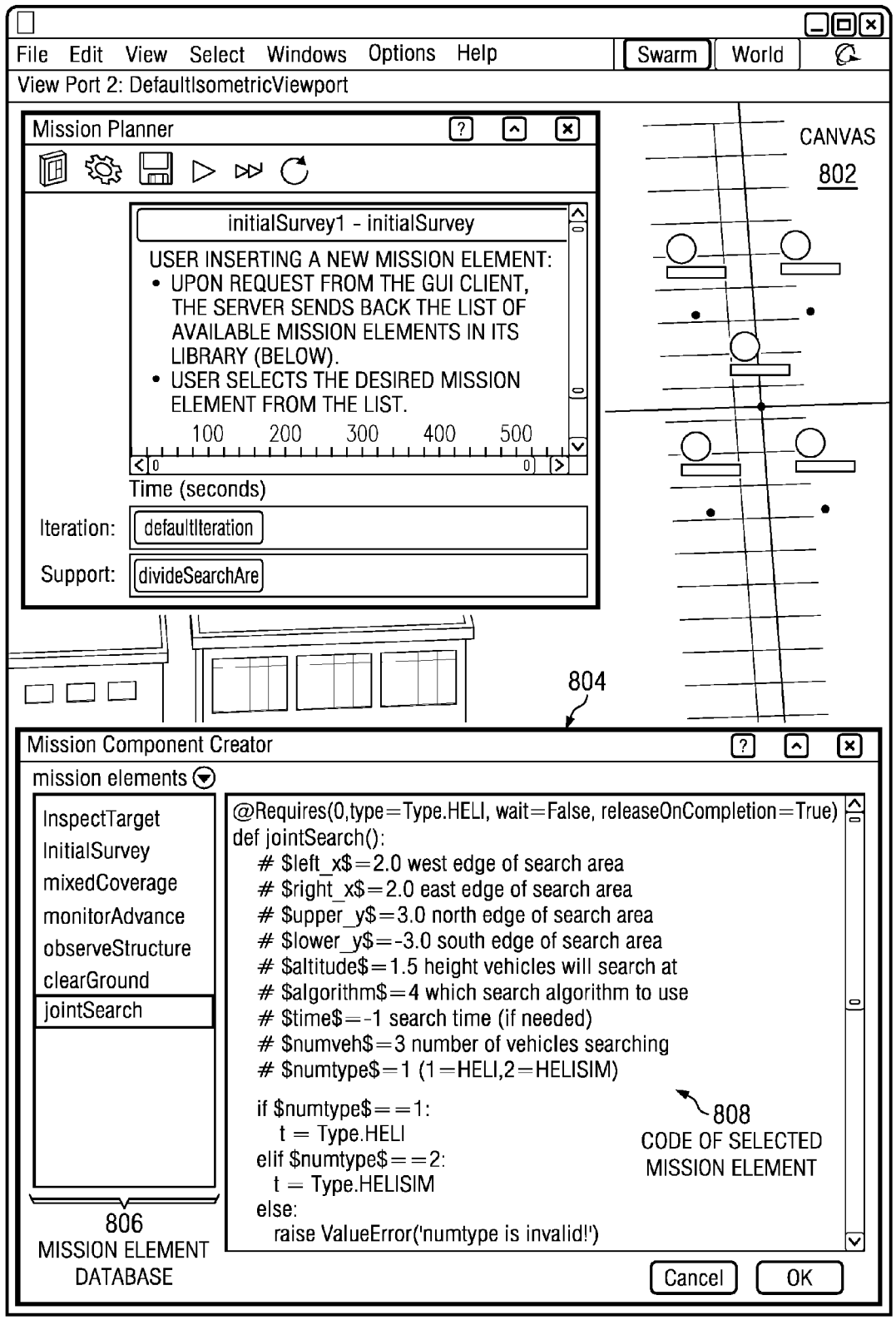
FIG. 8 is an illustration of a graphical user interface in accordance with an advantageous embodiment.
Figure 9:
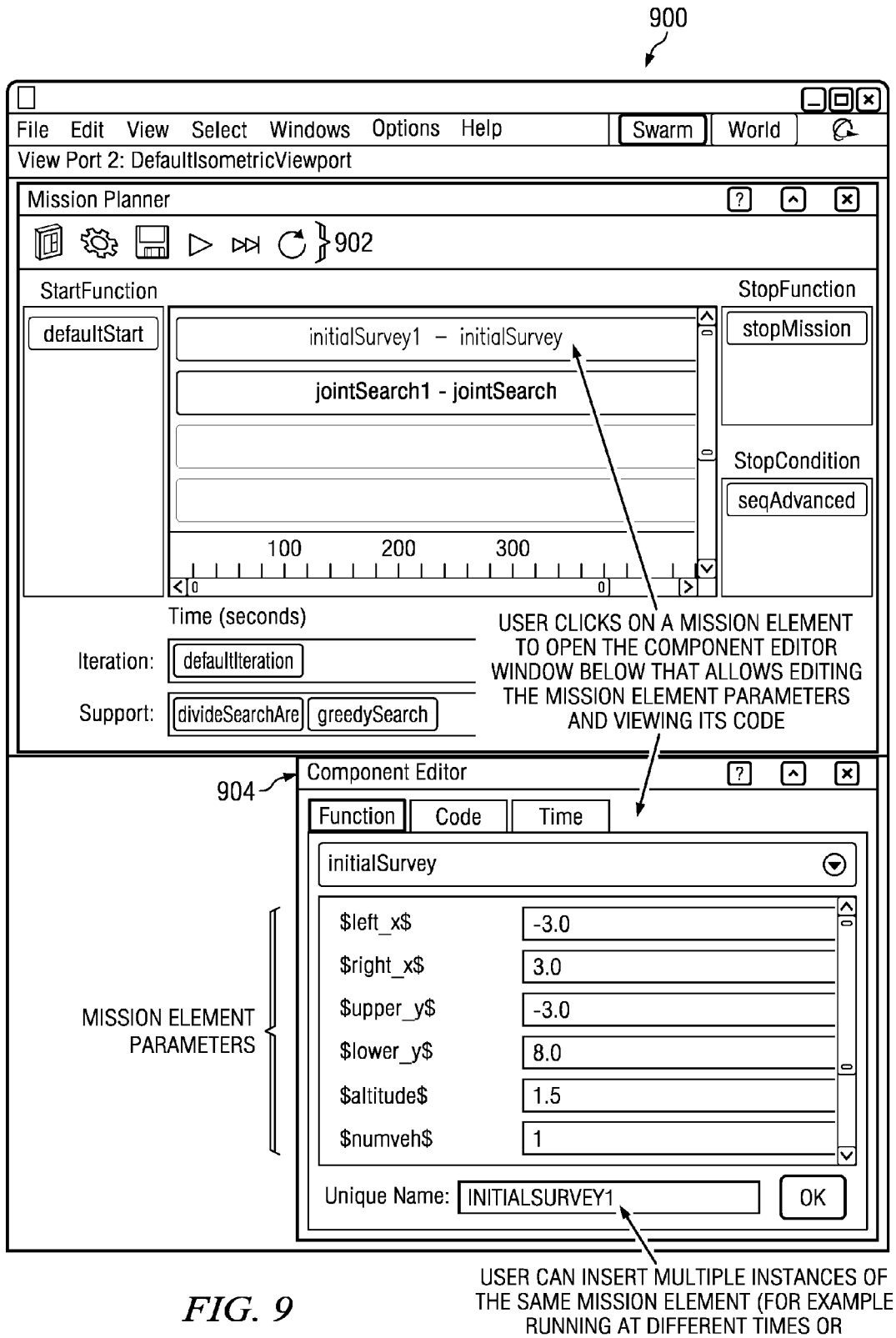
FIG. 9 is an illustration of a graphical user interface in accordance with an advantageous embodiment.

In an illustrative example, a user selects one of the Element buttons on the left side of the graphical user interface of FIG. 7, or in the graphical user interface of FIG. 6, right-clicks anywhere in the middle window, and selects "insert mission element". The user will then see mission component creator 804 illustrated in FIG. 8. The user selects one of the mission elements in mission element database 806 as illustrated in FIG. 8 and selects "OK", resulting in a view of component editor 904 illustrated in FIG. 9. The user fills out the mission element parameters, then selects the "Time" tab depicted in component editor 904 of FIG. 9 and fills out the Start and Stop Conditions, then selects "OK." This process is repeated for every mission element and every function that the user wants to add to the mission. At the end the user clicks the "save"

button, depicted as a floppy disk at the top of the graphical user interface of FIG. 8 and FIG. 9.

The illustration of mission planner client 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments. For example, other modules in addition to number of modules 406 may be included in mission planner client 400.

Figure 5:
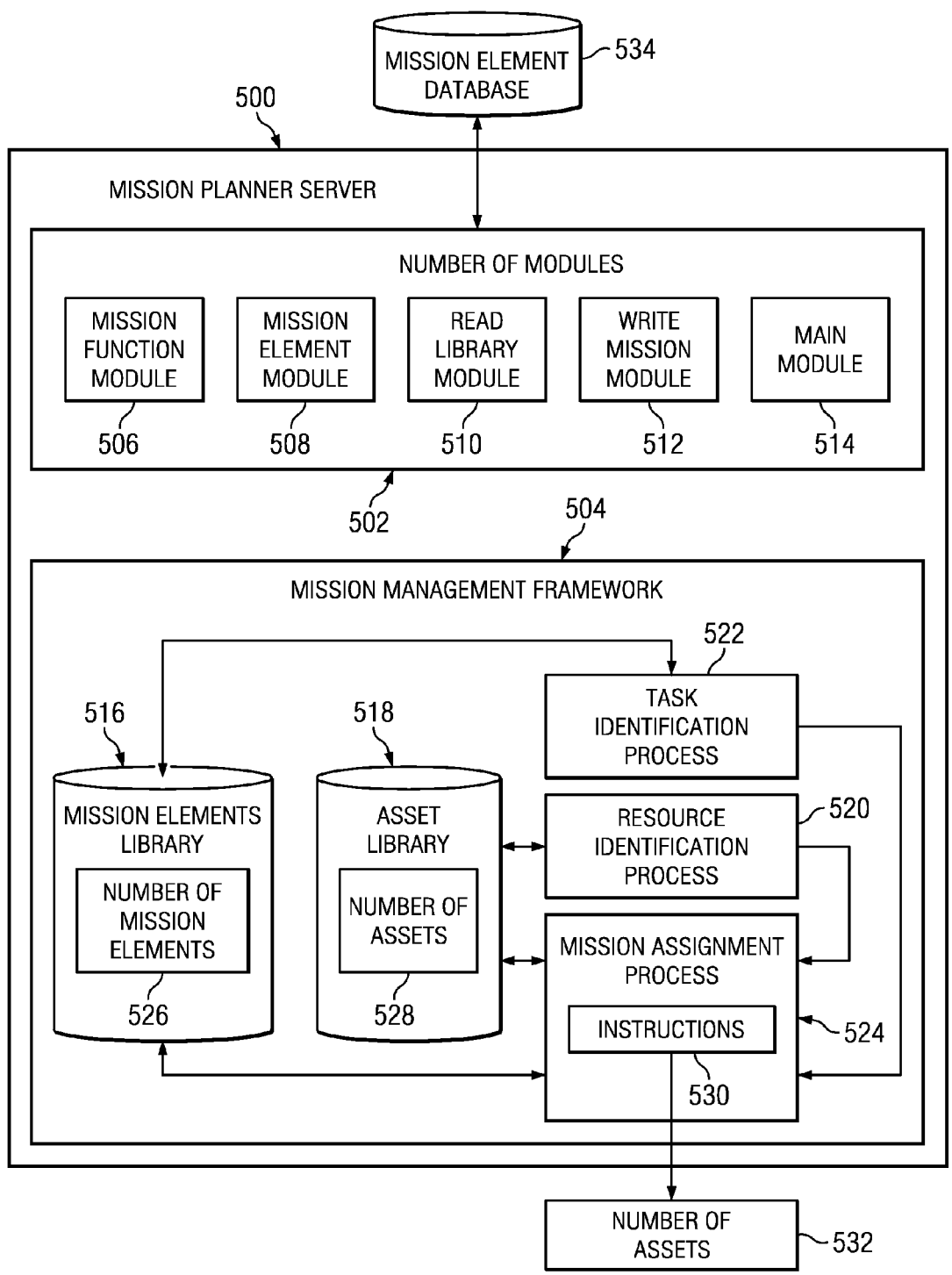
FIG. 5 is an illustration of a mission planner server in accordance with an advantageous embodiment.

With reference now to FIG. 5, an illustration of a mission planner server is depicted in accordance with an advantageous embodiment. Mission planner server 500 is an illustrative example of mission planner server 308 in FIG. 3.

Mission planner server 500 includes number of modules 502 and mission management framework 504. Number of modules 502 is an illustrative example of one implementation of number of modules 316 in FIG. 3. Number of modules 502 includes mission function module 506, mission element module 508, read library module 510, write mission module 512, and main module 514.

Mission function module 506 contains data necessary to identify unique mission functions. Mission function module 506 includes data such as, without limitation, the name, description, code, parameters, number of assets required, and estimated time to execute for each mission function. The code may be written in Python, for example. The parameters may be any variables in the mission that are capable of being changed by a user, such as number of users 314 in FIG. 3, for example. In an illustrative example, a parameter may be area coordinates or a number of iterations. A user may change area coordinates for a mission function, for example. The number of assets required and time to execute refers to the number of assets required for and the time to execute the mission elements.

Mission element module 508 contains information necessary for a mission element registered in the mission. Mission element module 508 includes information such as, without limitation, the function name as defined by its original file, the unique label as defined by the user, the code, any parameters that must be defined by a user, and the start and stop types as well as their values for the mission element. In an illustrative example, getCode( ) may be a function to return the Python code from the mission element, which replaces all instances of parameters with their defined value.

Read library module 510 contains functions to read mission functions from the file system as well as parse the mission functions for information. For example, vehTypeParams may be a data structure to hold parameters for the type of vehicle assets required in the mission. This data structure may contain the type, number, wait flag and release flag values, for example. In another illustrative example, readLibrary(dir) is a function that reads all files in a directory (dir) and returns the contents of the files as a dictionary with the key set as the file name without the extension, removing ".py" for example in Python code, and the contents of the file as its value. This function may assume that all files with "~" in their name are temporary files and should not be read, in this illustrative example.

In yet another illustrative example, parseFunc(code) is a function that takes the code for a mission element and parses it for several parameters. This function may assume that the first string surrounded by three quotation marks (""") is the description of the element. The function checks the Requires decorator to gather information about assets required for the mission element, for example. The function may look for the string "#Time=" and assume that the string following this but before the new line is the time estimated for this mission element to execute, for example. The function may also find user defined variables, denoted by a commented line starting with "#" followed by a variable surrounded by "$," for example. If "=" immediately follows the variable, without whitespace, it is stored as that variable's default value. If a string follows the variable or default value, with whitespace in between, then that string is assumed to be the description of that variable, in this illustrative example.

Write mission module 512 writes the mission to a python file readable by mission management framework 504. Write mission module 512 may use the following set of functions: writeMission (dir, name, startFunc, stopFunc, oniterations, supportFuncs, missionElements). This set of functions takes in several parameters in order to write the mission file. For example, dir is the directory to place the file and name is the name of the mission. The name of the mission will be concatenated with ".py" in this example. startFunc is the function that should follow the decorator OnStart to be compliant with the mission manager framework. stopFunc is the function that should follow the decorator OnStop. oniterations is the list of functions that require the decorator Oniteration. supportFuncs is a list of functions that must be printed at the beginning of the mission for use in later elements. missionElements is a list of missionElement objects to be written by write mission module 512. missionElements is the function that handles all the decorator additions necessary for the mission, for example.

Main module 514 runs the extensible markup language remote procedure call (XML-RPC) server and stores all of the mission functions. Data on the XML-RPC server is broken into possible functions and active functions. Possible functions are all of the available functions in the library, as read by read library module 510. Active functions are all of the functions that have been defined.

Possible functions are stored as dictionaries with the name of the function as the key and a missionFunction object as the value. All components are read for their respective directories, defined at the beginning of the mission script written by write mission module 512, at the beginning of the mission. Each possible component dictionary is stored in the possibleComponents dictionary using its component name as the key and the dictionary itself as the value. This makes retrieval easier in later functions.

Active functions are defined in several ways, depending on the component. Start and stop functions are defined as the name of the function given by the user. Iteration and support functions are defined as lists since more than one can be defined. In each case, the value is the name of the function. Mission elements are defined as a dictionary using the label of the element as the key and a missionElement object as the value.

Main module 514 also stores, on the XML-RPC server, variables to determine if the mission is started, the current sequence number, and the current mission time. The current mission time may be stored in seconds, in one illustrative example.

Mission management framework 504 includes mission elements library 516, asset library 518, resource identification process 520, task identification process 522, and mission assignment process 524. Mission elements library 516 includes number of mission elements 526. Number of mission elements 526 is stored mission elements built by number of modules 502 to be executed in a current mission. Number of mission elements 526 may be retrieved from mission element database 534 by number of modules 502 during mission creation, for example. Mission element database 534 is an illustrative example of one implementation of mission element database 319 in FIG. 3.

Asset library 518 includes number of assets 528. Number of assets 528 is a list of all assets, such as number of assets 324 in FIG. 3, along with a current status of each asset. For example, number of assets 528 may include information about the availability of an asset, the readiness of an asset for use in a mission and/or task, the health of an asset, the resource use of an asset, the resource depletion by an asset, the current status of an asset, and/or any other suitable information associated with an asset.

Task identification process 522 receives a mission script from write mission module 512 and uses mission elements library 516 to identify the mission elements, or tasks, needed for the mission. Resource identification process 520 receives a mission script from write mission module 512 and uses mission elements library 516 to identify a number of assets from number of assets 528 in asset library 518 that can accomplish the mission elements selected for the mission. Mission assignment process 524 receives the mission elements and assets identified by resource identification process 520 and task identification process 522, and assign the tasks identified to specific assets identified, generating instructions 530. Instructions 530 are then transmitted by mission management framework 504 to number of assets 532 for mission execution.

The illustration of mission planner server 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 6, an illustration of a graphical user interface is depicted in accordance with an advantageous embodiment. Graphical user interface 600 is an illustrative example of one implementation of mission planner client 306 in FIG. 3 using number of devices 312 in FIG. 3.

Graphical user interface 600 includes execution control buttons 602 and mission elements 604. Execution control buttons 602 may be selected by a user, such as number of users 314 in FIG. 3, to start a mission, stop a mission, advance a mission sequence, and any other number of control features for a mission. Mission elements 604 are an illustrative example of mission elements selected from number of mission elements 526 in FIG. 5 for inclusion into a mission, for example. One or more start functions 606 are selected from a library of available start functions. A start function is a function that runs at the start of the mission, for example as an initialization function for the mission. As an illustrative example, graphical user interface 600 depicts start function 606 called defaultStart that has been added by the user to this mission. One or more stop functions 608 are selected from a library of available stop functions. A stop function is a function that runs upon completion of the mission. A stop function may be, for example, without limitation, to clear all tasks and reset the number of assets. As an illustrative example, graphical user interface 600 depicts stop function 608 called stopMission that has been added by the user to this mission.

One or more stop conditions 610 are selected from a library of available stop conditions. A stop condition is a function that defines a stop condition of the mission. A stop condition may, for example, without limitation, define a time value at which the mission stops regardless of whether the individual mission elements completed execution or not. As an illustrative example, graphical user interface 600 depicts stop condition 610 called seqAdvanced that has been added by the user to this mission. One or more iteration functions 612 are selected from a library of available iteration functions. An iteration function is a function that runs on every iteration of the mission management framework. For example, an iteration function may run in parallel with the mission elements and display a report about available and deployed assets. As an illustrative example, graphical user interface 600 depicts iteration function 612 called defaultIteration that has been added by the user to this mission.

One or more support functions 614 are selected from a library of available support functions. A support function is a function that is called by one or more mission elements. For example, a support function may be an algorithm to partition a search area that can be used by different mission elements that perform search related tasks. As an illustrative example, graphical user interface 600 depicts support functions 614 called divideSearchArea and greedySearch that have been added by the user to this mission. Mission elements 604 are represented by bars the length of which is proportional to the mission element duration as measured by time scale 616, similar to a Gantt chart.

The illustration of graphical user interface 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, although the different functions are depicted as being selected by a user using graphical user interface 600, other advantageous embodiments may include an automated selection process that specifies the required support functions within each mission element.

With reference now to FIG. 7, an illustration of a graphical user interface is depicted in accordance with an advantageous embodiment. Graphical user interface 700 is an illustrative example of one implementation of mission planner client 306 in FIG. 3 using number of devices 310 in FIG. 3.

Graphical user interface 700 includes mission elements database 702 and library of mission elements 704. Mission elements database 702 is an illustrative example of one implementation of mission elements database 319 in FIG. 3. Library of mission elements 704 is an illustrative example of one implementation of mission elements library 516 in FIG. 5.

In this illustrative example, mission elements database 702 includes a number of mission elements, such as inspectTarget 706, observeStructure 708, mixedCoverage 710, monitorAdvance 712, initialSurvey 714, clearGround 716, and jointSearch 718. Library of mission elements 704 is an illustrative example of mission elements that a user selected from mission elements database 702 and added to the mission using graphical user interface 700. In this illustrative example, the user added five mission elements of initialSurvey 714, inspectTarget 706, jointSearch 718, monitorAdvance 712, mixedCoverage 710. Library of mission elements 704 are represented by bars in this illustrative example, the length of which is proportional to the mission element duration as measured by time scale 720 and/or sequence number 722. This proportional measurement may be similar to a Gantt chart, for example. A user, such as number of users 314 in FIG. 3, may enter values in sequence times estimates 724 to determine the estimated times at which the mission sequence is advanced in order to represent those mission elements that begin or end on sequence change on a time scale, for example. The user then selects update 726 to apply the values entered into sequence times estimates 724 to the mission elements display. In this illustrative example, the mission sequence starts at zero and changes to one at sixty seconds.

The illustration of graphical user interface 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 8, an illustration of a graphical user interface is depicted in accordance with an advantageous embodiment. Graphical user interface 800 is an illustrative example of one implementation of mission planner client 306 in FIG. 3 using number of devices 312 in FIG. 3.

Graphical user interface 800 includes canvas 802 and mission component creator 804. Canvas 802 may be an illustrative example of one implementation of display 404 of mission planner client 400 in FIG. 4. Canvas 802 is a graphical situational display of the mission environment where a user can drag a cursor using a device, such as a mouse, to select coordinates parameters of mission elements.

Mission component creator 804 is a dialog box that presents a user, such as number of users 314 in FIG. 3, with mission element database 806 and associated code of selected mission element 808. In an illustrative example, if a user selects a mission element from mission element database 806, the code for that mission element will be displayed in the dialog box to the right of the listing of mission elements. Mission component creator 804 is an example of select window module 418. In this example, the different options in select window module 418 are the mission elements in mission element database 806, and the different values of select window module 418 are code of selected mission element 808 for each mission element. Code of selected mission element 808 is displayed by popup element module 416.

The illustration of graphical user interface 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

With reference now to FIG. 9, an illustration of a graphical user interface is depicted in accordance with an advantageous embodiment. Graphical user interface 900 is an illustrative example of one implementation of mission planner client 306 in FIG. 3 using number of devices 312 in FIG. 3.

Graphical user interface 900 includes mission planner 902 and component editor 904. Mission planner 902 is an illustrative example of one implementation of mission planner client 306 in FIG. 3, presenting graphical depictions of functions for a user to manipulate. Component editor 904 may be an illustrative example of a dialog box presented by mission variable define module 414 in FIG. 4, for example, allowing a user to change variables in a mission. A user can insert multiple instances of the same mission element, for example running at different times or locations, and get unique names. In this example, the user entered initialSurvey1 as Unique Name of this instance of initialSurvey mission element.

The illustration of graphical user interface 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
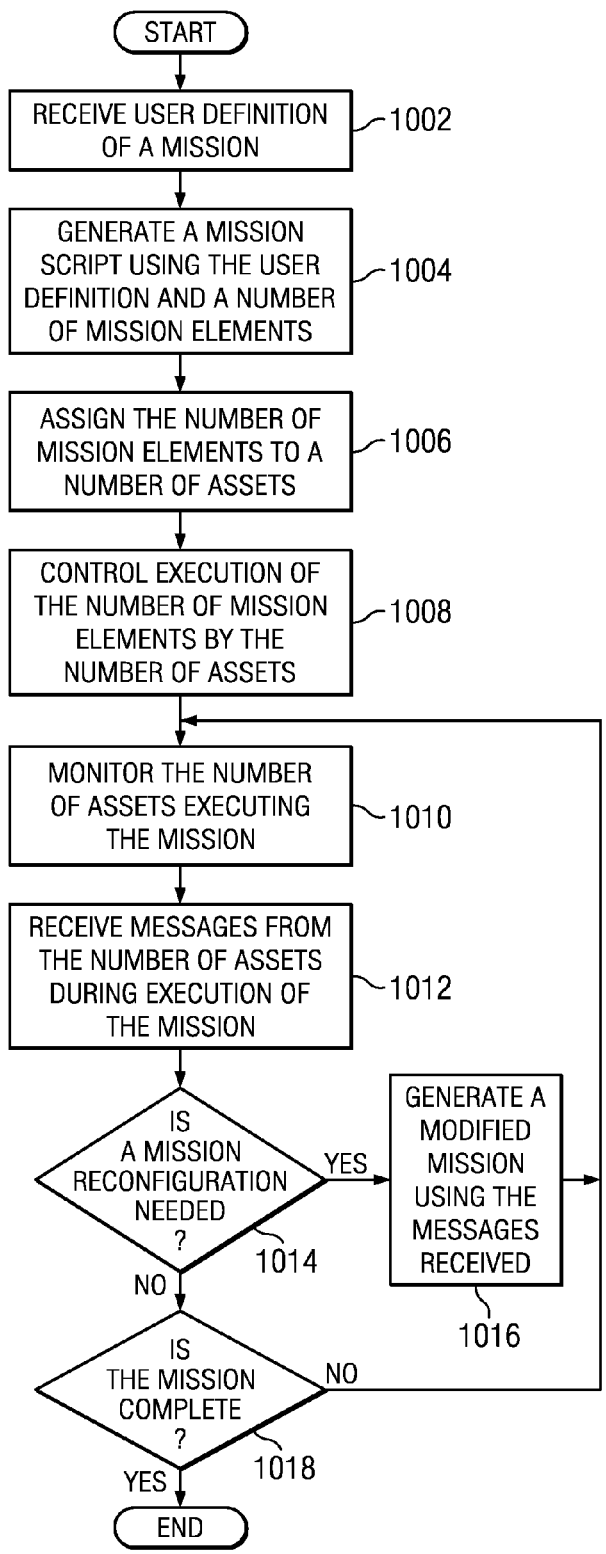
FIG. 10 is an illustration of a flowchart illustrating a process for mission planning in accordance with an advantageous embodiment.

With reference now to FIG. 10, an illustration of a flowchart illustrating a process for mission planning is depicted in accordance with an advantageous embodiment. The process in FIG. 10 may be implemented by a component such as mission planning system 302 in FIG. 3, for example.

The process begins by receiving a user definition of a mission (operation 1002). The user definition may be received using a graphical user interface, such as mission planner client 306 in FIG. 3, for example. The user definition may generally define a mission, or number of tasks, that needs to be accomplished.

The process generates a mission script using the user definition and a number of mission elements (operation 1004). The process may generate a mission script using a mission management framework, such as mission management framework 318 in FIG. 3, for example. The number of mission elements may define aspects of a mission, or specific tasks in a number of tasks, for example.

The process assigns the number of mission elements to a number of assets (operation 1006). The assets may be, for example, number of assets 324 in FIG. 3. The process controls execution of the number of mission elements by the number of assets (operation 1008). The process may generate instructions for the number of assets to execute the mission using the number of mission elements. The instructions may be transmitted to the number of assets using a communication system, such as communication system 320 in FIG. 3, for example. The execution control actions may include optional advancement of a mission sequence by the process to skip a mission element, for example, given feedback or messages received from the number of assets. Optionally, the sequence advancement of a mission may be controlled by a user, such as number of users 314 in FIG. 3, whereby the user gives this command to the mission management framework and not directly to the number of assets.

The process monitors the number of assets executing the mission (operation 1010). The process receives messages from the number of assets during execution of the mission (operation 1012). The process determines whether a mission reconfiguration is needed (operation 1014). A mission reconfiguration may be needed if an asset is unable to complete a mission element, or needs assistance completing a mission element, for example.

If a determination is made that a mission reconfiguration is needed, the process generates a modified mission using the messages received (operation 1016), and returns to operation 1010. This reconfiguration is performed autonomously by the mission management framework based on the messages received, such as vehicle failures or other changes in asset status, for example. Optionally, a user may also modify the mission by adding a number of mission elements to the mission, removing a number of mission elements that have not yet started from the mission, modifying the parameters of a number of mission elements that have not yet started, and/or any other suitable modification of the mission.

If a determination is made that a mission reconfiguration is not needed, the process then determines whether the mission is complete (operation 1018). If a determination is made that the mission is not complete, the process returns to operation 1010. If a determination is made that the mission is complete, the process terminates thereafter.

Figure 11:
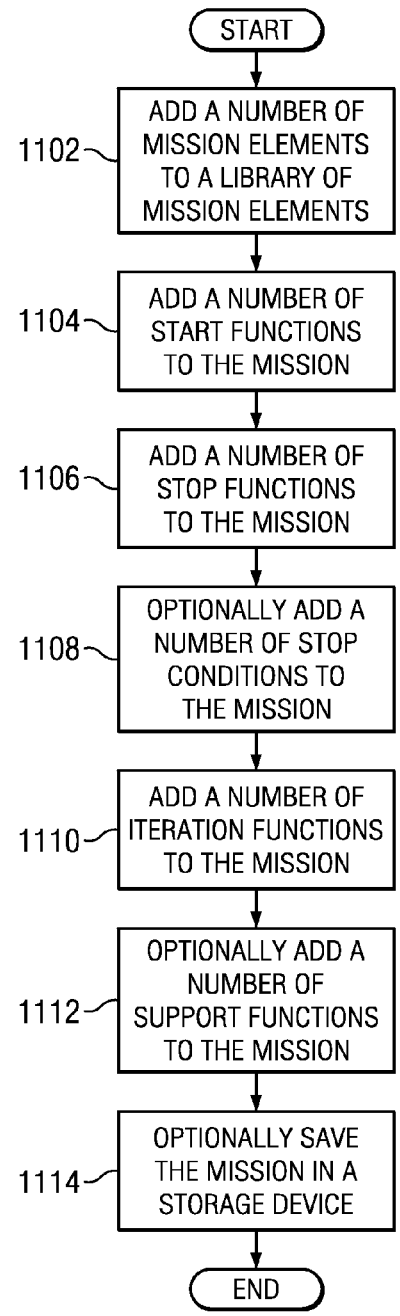
FIG. 11 is an illustration of a flowchart illustrating a process for defining a mission in accordance with an advantageous embodiment.

With reference now to FIG. 11, a flowchart illustrating a process for defining a mission is depicted in accordance with an advantageous embodiment. The process in FIG. 11 may be implemented by a component such as mission planning system 302 in FIG. 3, for example.

The process begins by adding a number of mission elements to a library of mission elements (operation 1102). The number of mission elements may be selected from a mission elements database, such as mission elements database 319 in FIG. 3, by a mission planner server, and saved into a mission elements library, such as mission elements library 516 in FIG. 5, for example.

The process adds a number of start functions to the mission (operation 1104). The start functions may be added from a library of start functions, such as start functions 606 in FIG. 6. The process then adds a number of stop functions to the mission (operation 1106). The stop functions may be added from a library of stop functions, such as stop functions 608 in FIG. 6. The process optionally adds a number of stop conditions to the mission (operation 1108). The stop conditions may be added from a library of stop conditions, such as stop conditions 610 in FIG. 6. The process adds a number of iteration functions to the mission (operation 1110). The iteration functions may be added from a library of iteration functions, such as iteration functions 612 in FIG. 6. The process optionally adds a number of support functions to the mission (operation 1112). The support functions may be added from a library of support functions, such as support functions 614 in FIG. 6. The process optionally save the mission in a storage device (operation 1114), with the process terminating thereafter. The process may execute the mission from the computer memory without saving it, for example.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk—read only memory (CD-ROM), compact disk—read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current mission planning systems involve scripting missions offline then running the missions after they are completed offline. Many of these current systems are specific to a single mission type, such as an area search mission for example. The existing solutions are not practical for dynamic applications where missions need to be created and modified on the fly. These current systems are rigid and do not provide for modifying a mission once execution starts. The systems currently available require a user to be able to write code and script the mission manually as well.

Thus, the different advantageous embodiments provide a system for real-time definition, execution, and monitoring of complex missions involving a multitude of assets. This system allows operators of autonomous vehicles to easily create, update, and execute complex missions involving multiple tasks that need to be executed by varying numbers and types of assets, using a graphical user interface. By having the client and server communicate over a network, the user can define, update, and execute missions from a remote location. Also multiple clients can be used to allow multiple users to simultaneously monitor and update missions. Mission definition is modular using the concept of "mission elements", and thus a user can monitor mission progress by graphically displaying the mission elements in a real-time Gantt chart format that shows the dependencies between mission elements, their completion status, and the resources assigned or required to each mission element. This is achieved using feedback from the mission management framework via the mission planner server. In addition, XML-RPC may be used for rich messaging between clients and server including querying the server library of mission elements, thus allowing easy updates of the library without any software change in the clients.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A system for dynamically modifying a mission plan comprising:
    a number of computers;
    a graphical user interface, wherein the graphical user interface is executed by a first computer in the number of computers;
    first program code stored on the first computer in the number of computers, wherein the first computer runs the first program code to define the mission plan using a number of mission elements from a mission elements database;
    a graphical display on the graphical user interface that graphically depicts the number of mission elements from the mission elements database, the graphical display including at least the mission elements of starting execution of the mission plan, inspecting a target, observing a structure, and monitoring an advance, the graphical display receiving user input for one or more of the number of mission elements that modifies the mission plan;
    second program code stored on at least a second computer in the number of computers wherein the first computer and the second computer communicate over a network, and wherein the second program code generates instructions for a number of assets to execute the mission plan in real time and monitor the number of assets during execution of the mission plan, wherein the instructions for the number of assets are assigned to the number of assets based on information about at least one of availability of the number of assets, readiness of the number of assets for use in executing the mission plan, health of the number of assets, resource use of the number of assets, resource depletions by the number of assets, or current status of the number of assets;
    a communications system that transmits messages from the number of assets to the number of computers and transmits the instructions from the number of computers to the number of assets;
    wherein the first computer is physically located in a remote location from the second computer, and wherein the instructions for the mission plan are generated on the second computer in real time during execution of the mission plan when the graphical display on the graphical user interface executed by the first computer receives the user input that modifies the mission plan; and
    a selection of the number of mission elements made by a number of users performing at least one of defining, modifying, executing, and monitoring execution of the mission plan in the second computer, and wherein a plurality of computers from the number of computers run multiple instances of the first program code, wherein the second computer is not one of the plurality of computers, and wherein the second computer communicates with the plurality of computers allowing multiple users to perform defining, modifying, executing, and monitoring execution of the mission plan simultaneously.

2. The system of claim 1, wherein the number of assets include at least one of a vehicle, sensor, charging station, and machine, the number of assets configured to communicate with the first computer.

3. The system of claim 1, wherein the number of mission elements is stored in a mission element library.

4. The system of claim 1, wherein the number of mission elements is generated by the first program code.

5. The system of claim 1, wherein the first program code communicates with the second program code over a network.

6. The system of claim 1, wherein the first program code communicates with the second program code using extensible markup language remote procedure call.

7. The system of claim 1, wherein the graphical user interface displays the mission plan in a Gantt chart format for a user to define and monitor execution of the mission plan.

8. The system of claim 1, wherein each mission element includes a number of mission tasks, and wherein the system defines, updates, executes and monitors multiple executions of mission plans simultaneously.

9. The system of claim 1, wherein the graphical user interface further comprises at least one of a start function, a stop function, a stop condition, and a support function.

10. The system of claim 1, wherein the graphical user interface further comprises the mission elements database.

11. The system of claim 1, wherein the graphical user interface further comprises a mission planner and a component editor.

12. The system of claim 1, wherein the graphical display further includes at least the mission elements of providing mixed coverage, performing an initial survey, clearing ground, and performing a joint search.

13. A method for mission planning, the method comprising:
    running first program code defining a mission plan using a number of mission elements from a mission elements database by a first computer in a number of computers;
    displaying a graphical display on a graphical user interface that graphically depicts the number of mission elements for the mission plan from the mission elements database, the graphical display including at least the mission elements of starting execution of the mission plan, inspecting a target, observing a structure, and monitoring an advance;

receiving, by the first computer, user input from the graphical display for one or more of the number of mission elements that modifies the mission plan;

generating instructions for the mission plan, by a second computer, wherein the first computer and the second computer communicate over a network, based on the number of mission elements when the first computer receives the user input from the graphical display that modifies the mission plan, wherein the instructions are assigned to a number of assets based on information about at least one of availability of the number of assets, readiness of the number of assets for use in executing the mission plan, health of the number of assets, resource use of the number of assets, resource depletions by the number of assets, or current status of the number of assets;

assigning the number of mission elements to the number of assets;

controlling execution of the number of mission elements by the number of assets;

receiving messages by a mission planner from the number of assets during execution of the mission plan, the mission planner remote from the number of assets;

monitoring the number of assets executing the mission plan;

determining whether a reconfiguration of the mission plan is needed; and a selection of the number of mission elements made by a number of users performing at least one of defining, modifying, executing, and monitoring execution of the mission plan in the second computer, and wherein a plurality of computers from the number of computers run multiple instances of the first program code, wherein the second computer is not one of the plurality of computers, and wherein the second computer communicates with the plurality of computers allowing multiple users to perform defining, modifying, executing, and monitoring execution of the mission plan simultaneously.

14. The method of claim 13, further comprising:
responsive to a determination that reconfiguration of the mission plan is not needed, determining whether execution of the mission plan is complete.

15. The method of claim 13, wherein the graphical display on the graphical user interface that graphically depicts the number of mission elements is a mission planner client.

16. The method of claim 13, wherein a mission script is generated by a mission management framework using the number of mission elements.

17. The method of claim 13, wherein the number of mission elements is generated by a mission planner server and selected by a mission management framework for assignment to the number of assets.

18. The method of claim 13, wherein a user using the graphical user interface and the number of assets inputs coordinate parameters to the number of mission elements so as to modify the number of mission elements.

19. The method of claim 13, wherein the receiving, generating, assigning, controlling, and monitoring steps are performed in real-time.

20. A computer program product for managing information for flights, the computer program product comprising:
a non-transitory computer recordable storage medium;
first program code, stored on the computer recordable storage medium, for defining a mission plan using a number of mission elements from a mission elements database by a first computer in a number of computers;

second program code, stored on the computer recordable storage medium, for displaying a graphical display on a graphical user interface that graphically depicts the number of mission elements for the mission plan from the mission elements database, the graphical display including at least the mission elements of starting execution of the mission plan, inspecting a target, observing a structure, and monitoring an advance;

third program code, stored on the computer recordable storage medium, for receiving user input from the graphical display for one or more of the number of mission elements that modifies the mission plan;

fourth program code, stored on the computer recordable storage medium, for generating a mission script using the number of mission elements;

fifth program code, stored on the computer recordable storage medium, for assigning the number of mission elements to a number of assets, wherein the assigning of the number of mission elements to the number of assets is based on information about at least one of availability of the number of assets, readiness of the number of assets for use in executing the mission plan, health of the number of assets, resource use of the number of assets, resource depletions by the number of assets, or current status of the number of assets;

sixth program code, stored on the computer recordable storage medium, for generating instructions for the number of assets to execute the mission plan using the number of mission elements by a second computer, wherein the first computer and the second computer communicate over a network;

seventh program code, stored on the computer recordable storage medium, for receiving messages by a mission planner from the number of assets during execution of the mission plan, the mission planner remote from the number of assets, the mission planner positioned remote from the number of assets;

eighth program code, stored on the computer recordable storage medium, for monitoring the number of assets executing the mission;

ninth program code, stored on the computer recordable storage medium, for determining whether a reconfiguration of the mission plan is needed;

tenth program code, stored on the computer recordable storage medium, responsive to a determination that the reconfiguration of the mission plan is needed, for generating, in the mission planner, modifications to the mission plan in real time based on the messages received by the mission planner from the number of assets; and a selection of the number of mission elements made by a number of users performing at least one of defining, modifying, executing, and monitoring execution of the mission plan in the second computer, and wherein a plurality of computers from the number of computers run multiple instances of the first program code, wherein the second computer is not one of the plurality of computers, and wherein the second computer communicates with the plurality of computers allowing multiple users to perform defining, modifying, executing, and monitoring execution of the mission plan simultaneously.

21. The computer program product of claim 20 further comprising:
program code, stored on the computer recordable storage medium, responsive to a determination that reconfiguration of the mission plan is not needed, for determining whether execution of the mission plan is complete.

22. The computer program product of claim 20, wherein the graphical display on the graphical user interface that graphically depicts the number of mission elements is a mission planner client.

23. The computer program product of claim 20, wherein the mission script is generated by a mission management framework.

24. The computer program product of claim 20, wherein the number of mission elements is generated by a mission planner server and selected by a mission management framework for assignment to the number of assets.

* * * * *